UNITED STATES PATENT OFFICE.

WILHELM HIEMENZ AND LUDWIG TAUB, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PHARMACEUTICAL COMPOUND.

1,073,855.  Specification of Letters Patent.  Patented Sept. 23, 1913.

No Drawing.  Application filed September 14, 1911.  Serial No. 649,286.

*To all whom it may concern:*

Be it known that we, WILHELM HIEMENZ, and LUDWIG TAUB, doctors of philosophy, chemists, citizens of the German Empire, residing at Elberfeld, Germany, have invented new and useful Improvements in New Pharmaceutical Compounds, of which the following is a specification.

We have found that the hitherto unknown non-aromatic amids and ureids (carbamid derivatives) of high-molecular halogen substituted fatty acids are therapeutically valuable products which are tasteless stable compounds and give off iodin or bromin in the organism. They have proved to be valuable remedies in medicine, an average dose being from 1-2 grams.

The process for producing the new compounds consists in converting according to the usual methods into the amids or ureids the high-molecular fatty acids or their derivatives substituted by bromin or iodin.

In order to illustrate the new process more fully the following example is given, the parts being by weight:—150 parts of diiodobrassidic acid are heated to 50–60° C. together with 65 parts of powdered phosphorous pentachlorid. When the evolution of hydrochloric acid ceases, the chlorid is introduced while stirring into a mixture of ice and 1000 parts of a concentrated aqueous solution of ammonia. The precipitate is recrystallized from alcohol. The amid is almost insoluble in most solvents. It can be recrystallized from glacial acetic acid. Melting point 93° C. In the same manner the chlorid can also be treated with amins *e. g.* diethylamin or urea.

The ureid of dibromobehenic acid melts at 149° C., the amid melts at 78° C., the amid of iodobehenic acid melts at 78° C.

We claim:—

1. The herein described amids of dihalogen-substituted fatty acids of high molecular weight being solid stable compounds, tasteless and insoluble in water, substantially as described.

2. The herein-described amids of di-iodo substituted fatty acids of high molecular weight, being solid stable compounds, tasteless and insoluble in water, substantially as described.

3. The herein described amid of diiodobrassidic acid, being a solid stable compound, forming crystals melting at 93° C., substantially as described.

In testimony whereof we have hereunto set our hands in the presence of two subscribing witnesses.

WILHELM HIEMENZ. [L. S.]
LUDWIG TAUB. [L. S.]

Witnesses:
ALBERT F. NUFER,
L. NUFER.